United States Patent
Griffiths et al.

(10) Patent No.: US 6,734,959 B2
(45) Date of Patent: May 11, 2004

(54) PROBER FOR TESTING LIGHT-EMITTING DEVICES ON A WAFER

(75) Inventors: David J. Griffiths, South Sutton, NH (US); Jonathan D. Scheuch, New London, NH (US); Sean David Griffin, Henniker, NH (US); Ronald A. Murray, Mont Vernon, NH (US); Kelly A. Edgar, Sunapee, NH (US)

(73) Assignee: Labsphere, Inc., North Sutton, NH (US)

( * ) Notice: Subject to any disclaimer, the term of this patent is extended or adjusted under 35 U.S.C. 154(b) by 65 days.

(21) Appl. No.: 10/193,522

(22) Filed: Jul. 11, 2002

(65) Prior Publication Data

US 2003/0020897 A1 Jan. 30, 2003

Related U.S. Application Data

(60) Provisional application No. 60/304,989, filed on Jul. 12, 2001.

(51) Int. Cl.⁷ .................................................. G01J 1/04
(52) U.S. Cl. ...................................................... 356/236
(58) Field of Search ................................. 356/213–215, 356/219, 220, 236

(56) References Cited

U.S. PATENT DOCUMENTS

| | | | |
|---|---|---|---|
| 5,498,973 A | * | 3/1996 | Cavaliere et al. ............ 324/765 |
| 6,248,604 B1 | * | 6/2001 | Eng et al. ...................... 438/21 |
| 6,501,260 B1 | * | 12/2002 | Hu et al. .................. 324/158.1 |

* cited by examiner

Primary Examiner—Michael P. Stafira
(74) Attorney, Agent, or Firm—Warner Norcross & Judd

(57) ABSTRACT

A prober for measuring the light output of digital devices integrally formed on a single wafer. The prober includes a light-integrating sphere sequentially aligned with selected devices. Each time that a device is aligned with the sphere, the device aligned with the sphere is activated, so that the light output of each device is individually measured. In the disclosed embodiment, the devices are vertical cavity surface emitting lasers (VCSELs) and light emitting diodes (LEDs).

11 Claims, 2 Drawing Sheets

PROBER FOR TESTING LIGHT-EMITTING DEVICES ON A WAFER

BACKGROUND OF THE INVENTION

This nonprovisional application claims priority from provisional application No. 60/304,989 filed Jul. 12, 2001 and entitled "VCSEL/LED Wafer Probe System".

The present invention relates to instruments and methods for probing wafers of digital devices, and more particularly to probing wafers of digital light-emitting devices.

Digital light-emitting devices are well known and widely used in many applications. Two such devices are vertical cavity surface emitting lasers (VCSELs) and light-emitting diodes (LEDs). These devices are fabricated on wafers with counts of over 20,000 individual devices on a three-inch diameter wafer being common. After fabrication on the wafer, the devices are cut into individual devices (called die) and packaged for use.

Manufacturers of light-emitting devices desire to make optical measurements of the individual devices before the wafers are cut into individual dies. The motivation for such measurements is that the characteristics of the devices can vary significantly across a single wafer. By mapping a wafer, a manufacturer can bin the die after cutting, separating the good from the bad and segregating the good ones by power output, wavelength, or other parameters. Performing this testing while the devices are still in wafer form permits the manufacturer to eliminate the bad ones before spending money to package them. Also, some manufacturers sell bare die to packagers, who want specifications on what they are buying.

Semiconductor manufacturers have been probing devices and circuits on wafers for many years, for example, measuring the electrical properties and performance of the integrated circuits on wafers. Instruments for probing digital devices are known as "probers" and are manufactured and sold, for example, by Karl Suss America, Inc. of Waterbury Center, Vt. (www.suss.com).

Usually, information on two optical parameters is desired—the total power and the spectral distribution. Currently, the spectral distribution of the light is measured using a fiber optic spectrometer mounted on the prober. The device can be used in conjunction with the microscope which is mounted on the prober for initial alignment of the wafer on the prober bench. The prober moves the wafer to sequentially align each light-emitting device with the fiber optic pick-up; the light-emitting device is activated; and the light is captured by the fiber optic pick-up. Unfortunately, problems arise in conjunction with the use of fiber optic pick-ups. First, the device to be tested must be precisely aligned with the pick-up. If not, a portion of the light output is lost (i.e. does not enter the pick-up), negatively impacting the accuracy of the measurement. Second, the fiber optic pick-up receives only a portion of the light even under optimal circumstances, because the light emitted from light-emitting devices diverges. This further detracts from the accuracy of the measurement.

SUMMARY OF THE INVENTION

The aforementioned problems are overcome in the present invention in which a light-integrating sphere is included in a wafer prober for more completely capturing the light outputted by each device. The sphere has a relatively large opening in conjunction with the previously used fiber optic pick-ups. Accordingly, a significantly higher percentage of the light from the device is captured by the sphere.

More specifically, the invention comprises a wafer prober on which an integrating sphere is mounted. In operation, the prober aligns at least one light-emitting device with the sphere, activates each device aligned with the sphere, and measures the light output of the activated device.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
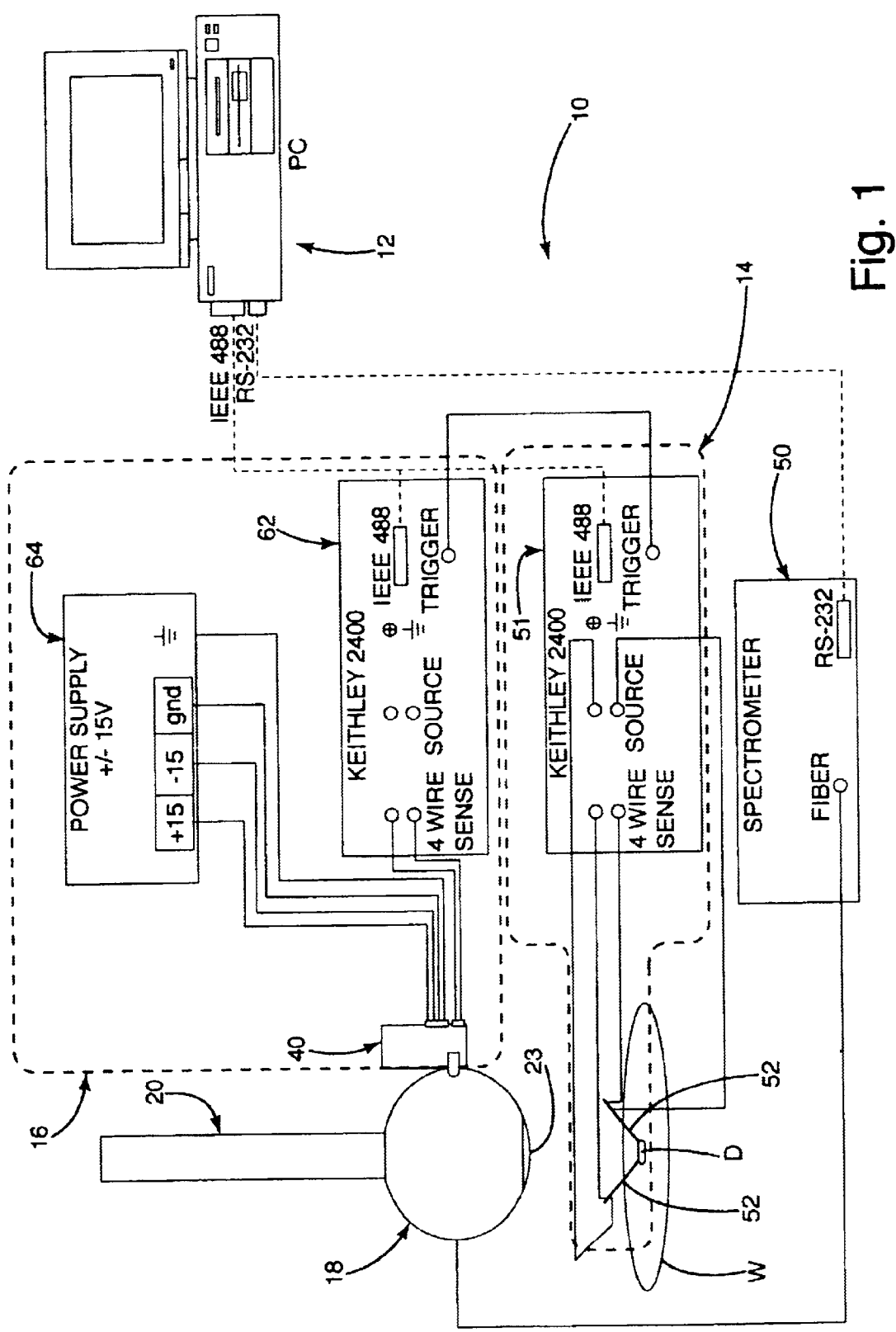
FIG. 1 is a schematic diagram of the prober of the present invention.

A wafer prober constructed in accordance with a preferred embodiment of the invention is schematically illustrated in FIG. 1 and generally designated 10. The prober includes a computer control 12, a source system 14, and a measuring system 16, which in turn includes a light-integrating sphere 18.

With the exception of the integrating sphere 18 and the related circuitry, the prober is generally well-known to those skilled in the prober art. For example, an appropriate prober is manufactured and sold by Karl Suss America, Inc. of Waterbury Center, Vt. as Model PA-200. This prober includes a wafer bench (not shown) for supporting a wafer W and wafer chucks (also not shown) for retaining the wafer W on the wafer bench. Other probers suitable for use in conjunction with the present invention will be readily recognized by those skilled in the art.

The conventional components of the prober 10 need be only briefly described. The control computer 12 can be any one of a wide variety of desktop or other suitable computers. Also the software for operating the computer 12 is well known by those skilled in the software art. The computer 12 communicates with the spectrograph 50 via an RS-232 connection, and with the source system 14 and the measurement system 16 via an IEEE 488 connection.

The source system 14 includes a Keithley 2400 source meter 51 and a pair of probing tips 52. The probing tips 52 are in fixed physical location with respect to the sphere 18. Under the control of computer 12, the source meter 51 provides power to the prober tips 52 when a device D on the wafer W is properly aligned with the sphere 18. The source meter also measures electrical properties at the probing tips.

The measurement system 16 includes a Keithley 2400 radiometer 62, a power supply 64, and the integrating sphere 18. The power supply 64 provides power to the detector 40. The radiometer 62 receives the measurement signals from the detector 40.

The sphere 18 is known to those skilled in the light and color measurement art. For example, an appropriate sphere is manufactured and sold by Labsphere, Inc. of North Sutton, N.H. as Model VCSEL-0850, which is fabricated of a material identified by the trademark SPECTRALON®. The sphere 18 includes a sample port 23 through which sample light enters the sphere. The diameter of the sample port is larger, and preferably substantially larger than the lateral dimensions of the light-emitting portion of a device D on the wafer W to enhance the amount of light captured by the sphere during measurement.

Figure 2:
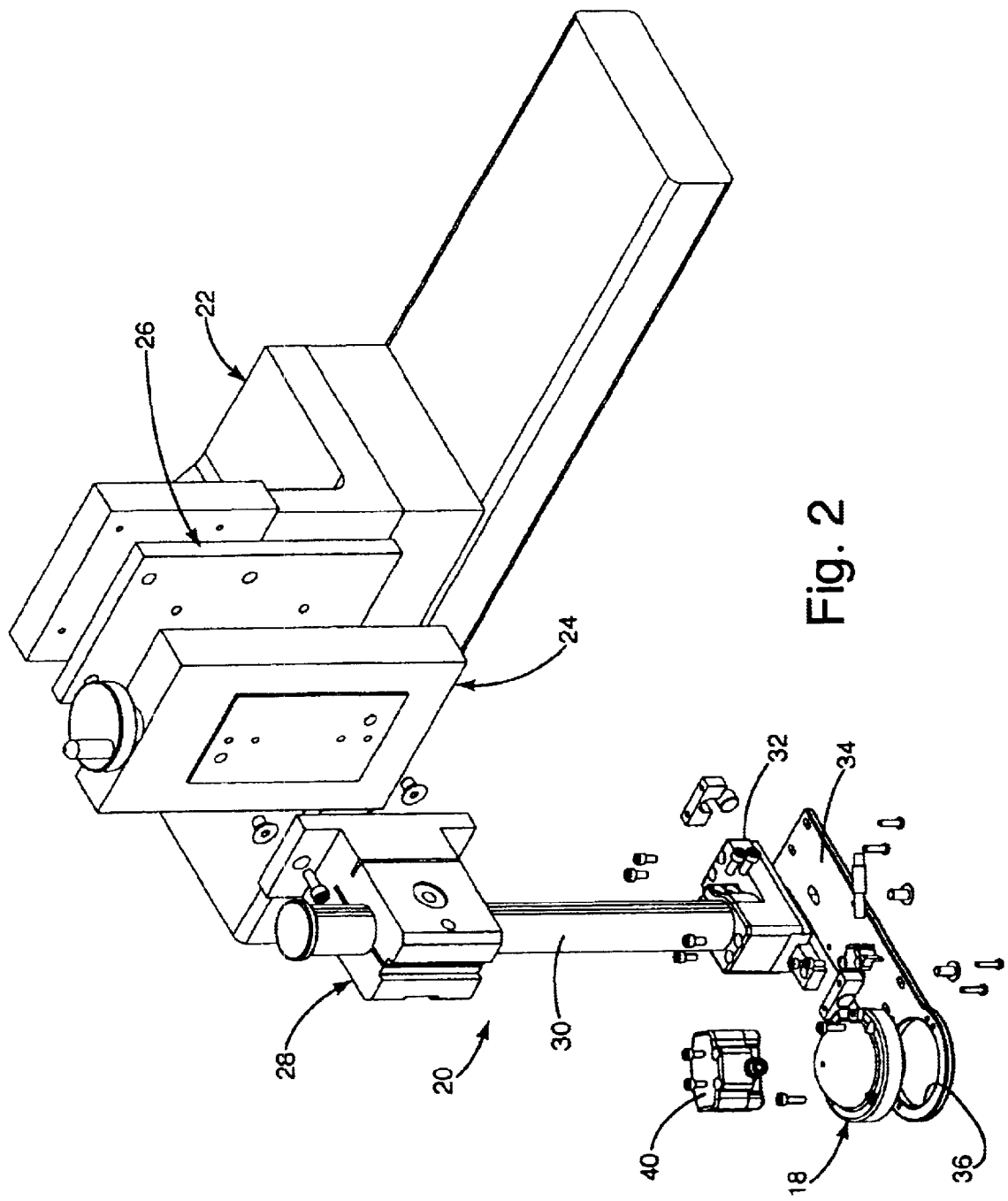
FIG. 2 is a perspective, partially exploded view of the integrating sphere and its related mounting hardware.

The sphere support assembly 20 is illustrated in FIG. 2. While the hardware has been specifically designed for the present application, the basic components will be recognized by those skilled in the art. The support 22 is a part of the prober. The Unislide 24 is connected to the support 22 through a conversion plate 26. An Ausleger 28 is mounted on the Unislide 24 and in turn supports a post 30 for vertical adjustment. A verizontal translator bracket 32 is mounted on the lower end of the post 30. The sphere support plate 34 is mounted on the translator bracket 32. The plate 34 defines a aperture 36 within which the sphere 18 is mounted. A detector 40 of conventional design is mounted on the side of the sphere 18 to provide light measurement as is conventional in the light measurement art. The remaining but unnumbered elements included in FIG. 2 are conventional mounting elements and need not be described in detail.

The spectrograph 50 is utilized to measure the light in the sphere 18 as is customary in the art. This information is provided to the computer 12 for appropriate adjustment and/or correction of the light measurements.

OPERATION

The operation of the present prober is quite similar to previous probers. Under the control of the computer 12, the prober positions the wafer so that a selected light-emitting device D on the wafer W is aligned with the sphere 18, and more particularly with the sample port 23. When the wafer is properly positioned, the prober tips 52 contact the electrical power leads of that device. Power is then supplied to the device through the prober tips 52 under the control of the computer 12. The light emitted from the device radiates into the sphere 18 through the opening 23 and is detected by the detector 40. The measurement information is transferred from the radiometer 62, the source meter 51, and the spectrograph 50 to the computer 12.

After a measurement is taken, the wafer W is repositioned as necessary to align another device D with the sphere 18 for measurement. The sequence of positioning and measuring continues until all desired devices on the wafer have been sampled.

If the sample opening 23 has a diameter more than twice as large as a single device D, then two or more devices can be aligned with the sphere 18 at a single time, so that two or more devices can be measured without repositioning the wafer. Each device aligned with the opening is sequentially and individually activated and measured before the wafer is repositioned. This accelerates the measurement of all devices on the wafer.

The use of an integrating sphere maximizes the amount of light captured from the device, and thereby improves the accuracy of the resulting measurement. Ideally, the sphere 18 is positioned as close to the wafer as physically possible. When VCSELs are to be measured, the sphere is positioned four millimeters (4 mm) above the surface of the wafer and the opening is 6.3 mm in diameter. Because the VCSEL emits light in a 40-degree cone, this arrangement results in all of the emitted light being captured by the sphere. When LEDs are to be measured, it is anticipated that the sphere will need to be positioned more closely to the wafer because of the greater angle of divergence of the emitted light. Specifically, it is contemplated that the sphere will need to be positioned approximately one-half millimeter (0.5 mm) from the wafer. In this case, it is further contemplated that the prober tips 52 will need to be recessed into the sphere 18 to enable the sphere position to be as close to the wafer as desired.

The optical characteristics that can be measured by the present system include:

For VCSELs:
Radiant flux (optical power)
Power
LIV curves
Spectral properties
Peak wavelength
Full-width/half-max (FWHM)
Kink current
Kink voltage
Threshold power
Threshold current
Threshold voltage
Wall plug efficiency
Slope efficiency
External quantum efficiency
Forward current
Forward voltage For LEDs:
Luminous flux
Radiant flux
Chromaticity
Dominant wavelength
Peak wavelength
Full-width/half-max (FWHM)
Centroid wavelength
Center wavelength
Purity
Leakage current
Reverse voltage
Forward current
Forward voltage The above descriptions are those of preferred embodiments of the invention. Various alterations and changes can be made without departing from the spirit and broader aspects of the invention, which are to be interpreted in accordance with the principles of patent law, including the doctrine of equivalents.

The embodiments of the invention in which an exclusive property or privilege is claimed are defined as follows:

1. An apparatus for measuring the output of light-emitting devices arranged in an array, said apparatus comprising:
    a light integrating sphere having a sample opening;
    drive means for sequentially aligning at least two of the digital devices and said sample opening, whereby at least two digital devices can be measured after each actuation of said drive means;
    power means for sequentially powering the at least two digital devices; and
    measurement means for measuring at least one characteristic of the light from each of the at least two digital devices entering said sphere through said opening.

2. An apparatus as defined in claim 1 wherein said drive means comprises a prober.

3. An apparatus as defined in claim 1 wherein said digital devices comprise diode lasers.

4. An apparatus as defined in claim 3 wherein said diode lasers comprise vertical cavity surface emitting lasers (VCSELs).

5. An apparatus as defined in claim 1 wherein said digital devices comprise light-emitting diodes (LEDs).

6. A method of measuring the output of light-emitting devices arranged in an array, said method comprising the steps of:

sequentially aligning a light integrating sphere and at least two of the devices in the array, whereby at least two devices can be tested after each alignment;

sequentially activating each of the at least two devices aligned with the sphere; and measuring the light radiated from each of the sequentially activated devices into the sphere.

7. A method as defined in claim 6 wherein the devices are integrally joined in a single substrate.

8. A method as defined in claim 6 wherein said aligning step is performed using a prober.

9. A method as defined in claim 6 wherein the devices comprise diode lasers.

10. A method as defined in claim 9 wherein the diode lasers comprise vertical cavity surface emitting lasers (VCSELs).

11. A method as defined in claim 6 wherein the devices comprise light-emitting diodes (LEDs).

* * * * *